UNITED STATES PATENT OFFICE.

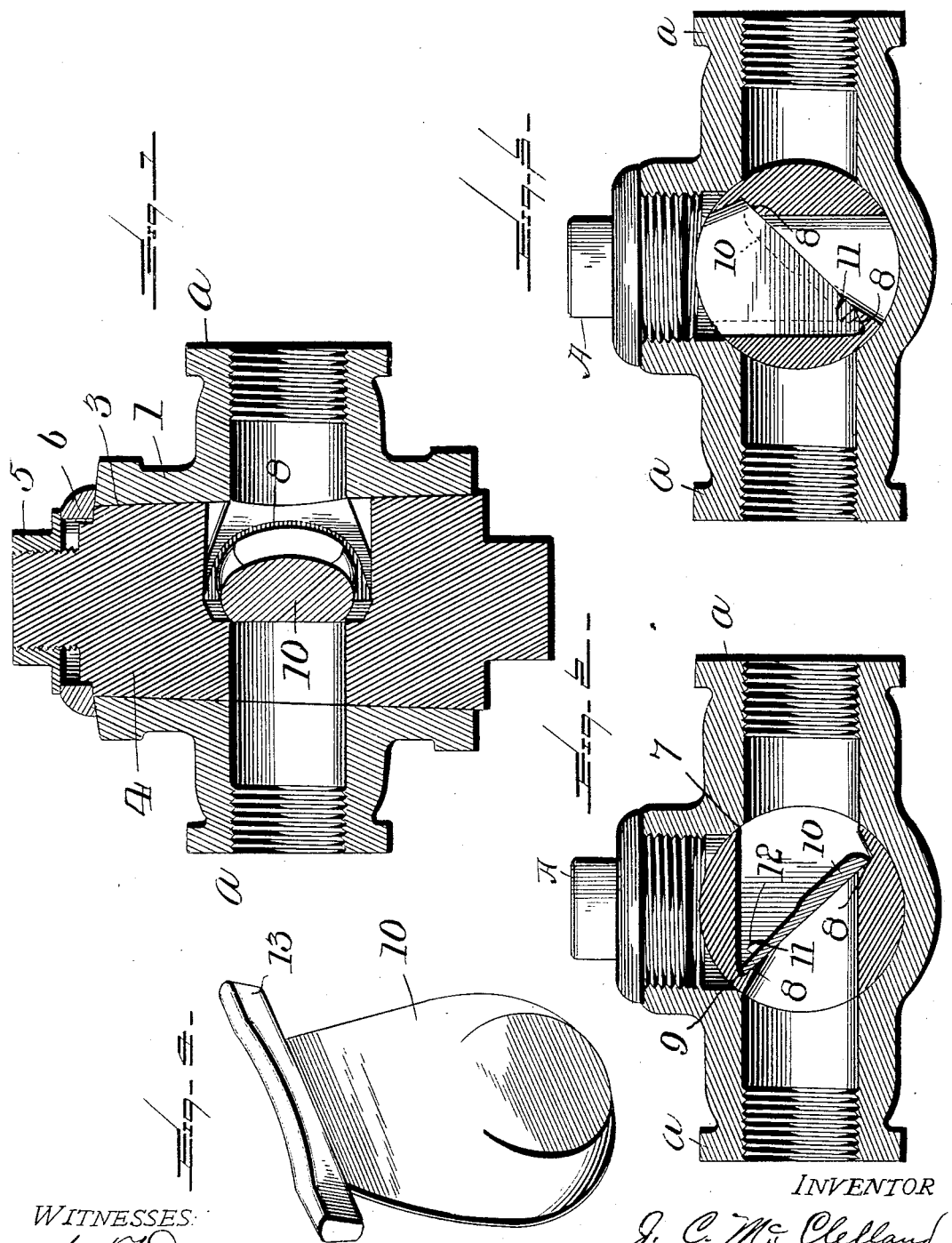

JESSE C. McCLELLAND, OF RENFREW, PENNSYLVANIA.

STOP AND AUTOMATIC-CHECK VALVE.

SPECIFICATION forming part of Letters Patent No. 713,331, dated November 11, 1902.

Application filed September 9, 1901. Serial No. 74,863. (No model.)

*To all whom it may concern:*

Be it known that I, JESSE C. MCCLELLAND, a citizen of the United States of America, residing at Renfrew, in the county of Butler and State of Pennsylvania, have invented certain new and useful Improvements in Stop and Automatic-Check Valves, of which the following is a specification.

This invention relates to valves, and particularly to one designed for and known as a "stop and automatic check."

The object of the invention is to produce a valve for use in oil-piping or in such other relation where it may be automatically controlled and operated by the pressure in the main or branch pipes. In piping oil the pressure on the main often becomes greater than the pressure carried by the branch pipes, in which contingency unless communication from the main to the branch pipes is broken the fluid would flow from the main to the branch pipes and overflow the tanks which supply said branch pipes. As now commonly used an operator must be present to manipulate the valves according to the pressure on the pipes. By the use of this stop and automatic cut-off valve the port which establishes communication between the branch and main is closed when excess of pressure is on the main and is opened when the pressure on the branch pipe becomes greater than that of the main.

A further object of the invention is to produce a valve having a plug with a transversely-disposed port controlled by a gravity-valve, the said port being in such relation as to permit the plug proper to close the openings leading to the branch or main pipes.

Furthermore, the object of the invention is to provide for the removal of accumulation in the port of the plug which would interfere with the efficiency of the valve. As now commonly employed when valves become inoperative through the deposit on the valve-seats and the valve is disconnected for removing the deposit a considerable quantity of oil in the branch pipes between the valves is lost, owing to the fact that the valve-plugs must be removed to dislodge the deposit. By the use of this invention the passage of oil through the valve-casing is prevented and the valve in the plug is accessible and removable, after which the accumulation which interferes with the seating of the valve may be taken out.

With the above and other objects in view the invention comprises a valve of the character noted possessing advantages in points of simplicity, efficiency, durability, and inexpensive production to be hereinafter more fully set forth and claimed.

In describing the invention in detail reference will be had to the accompanying drawings, forming part of this specification, wherein like characters denote corresponding parts in the several views, and in which—

Figure 1 is a horizontal sectional view of a valve embodying the invention. Fig. 2 is a vertical section. Fig. 3 is a similar view showing the plug turned at right angles to the position shown in Fig. 1. Fig. 4 is a perspective view of the valve for controlling the port in the plug.

In the drawings, 1 indicates the valve-casing, having connections *a* for pipes for conveying fluid. An opening 3 is formed in the casing, held closed by the plug A, said plug being removable when access to the interior of the casing is required for removing accumulations or for other causes. The plug 4 is held in the casing by means of the nut 5 bearing against the ring 6, said ring abutting the end of the casing. The plug 4 has a transversely-disposed port 7, and the plug has formed therein a valve-seat 8, disposed at an angle of approximately forty-five degrees with relation to the port. At the lower edge of the valve-seat the plug is cut outwardly at an angle with relation to the seat to form a bearing 9 for the valve 10. From the outer edge of the bearing the wall of the cavity is flared slightly with relation to the valve-seat, while the wall thereabove to the surface of the plug is approximately parallel with the wall of the port through the plug.

Lugs 11 are formed on the end walls of the cavity near the bottom of the valve-seat to form the shoulders 12, against which the trunnions 13 of the valve abut to limit the movement of the valve and to retain it in position to be operated.

From an inspection of the drawings, Fig. 2 indicates the valve closed, in which position liquid cannot pass through the port of the plug, this being the position the parts will assume when the pressure on the main is greater than that from the supply-tank. It will be observed that when the pressure on the main is reduced and the pressure on the branch overcomes that of the main the valve will be swung upwardly on its trunnions and the passage is unobstructed for the flow therethrough. As soon as the pressure on the main overcomes that of the branch pipe the valve will descend on its seat, as shown in Fig. 2, and cut off communication of the branch pipe with the main and stop the flow of liquid.

The valve shown in Fig. 3 illustrates the passage through the casing as closed by the plug and the port of the plug turned to aline with the opening in the top of the casing for the removal of the deposit. When in such position, the valve may be lifted out and the valve-seat may be scraped or otherwise cleaned according to the requirements.

The valve will be found very sensitive and falls by gravity before the wall against which the valve rests has reached a vertical plane.

The construction, operation, and advantages will, it is thought, be understood from the foregoing description, it being noted that various changes may be resorted to in the proportions and details of construction for successfully carrying the invention into practice without departing from the scope of the claim and invention.

Having thus fully described the invention, what I claim as new, and desire to secure by Letters Patent, is—

In a stop and check valve, a casing having an opening in its top, a plug A, in the opening, a plug 4, in the casing having a port 7, a valve-seat 8, at an angle approximating forty-five degrees, with relation to the walls of the port, bearings formed at the junction of the valve-seat and wall of the plug, the wall of the cavity being flared slightly with relation to the valve-seat from the outer edge of the bearings, a valve having trunnions resting in the bearings, and lugs formed on the end walls of the cavity near the bottom of the valve-seat for engaging the trunnions as and for the purpose described.

In testimony whereof I affix my signature, in the presence of two witnesses, this 1st day of August, 1901.

JESSE C. McCLELLAND.

Witnesses:
EDGAR M. LYONS,
HENRY T. BRIGHT.